(12) United States Patent
Bornstein

(10) Patent No.: US 11,903,432 B2
(45) Date of Patent: *Feb. 20, 2024

(54) FACE SHIELD INTEGRATION WITH EYEWEAR

(71) Applicant: Julia Bornstein, Muttontown, NY (US)

(72) Inventor: Julia Bornstein, Muttontown, NY (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/666,480

(22) Filed: Feb. 7, 2022

(65) Prior Publication Data

US 2022/0151320 A1   May 19, 2022

Related U.S. Application Data

(63) Continuation-in-part of application No. 17/558,576, filed on Dec. 21, 2021, which is a continuation-in-part of application No. 17/528,134, filed on Nov. 16, 2021, now Pat. No. 11,497,262, which is a continuation of application No. 16/908,506, filed on Jun. 22, 2020, now Pat. No. 11,206,883, which is a continuation of application No. 16/905,839, filed on Jun. 18, 2020, now Pat. No. 11,206,882.

(51) Int. Cl.
*A41D 13/11* (2006.01)
*G02C 5/22* (2006.01)

(52) U.S. Cl.
CPC .................. *A41D 13/1184* (2013.01)

(58) Field of Classification Search
CPC .......... A61F 9/029; A61F 9/025; A61F 9/045; A61F 9/02; A61F 9/022; G02C 7/16; G02C 11/12; G02C 2200/08; G02C 9/00; A41D 13/1184; A41D 13/11; A62B 18/082

See application file for complete search history.

(56) References Cited

U.S. PATENT DOCUMENTS

| | | | |
|---|---|---|---|
| 1,561,958 A | 11/1925 | Tully | |
| 2,093,536 A | 2/1936 | Alvord | |
| 2,253,101 A | 4/1939 | Thoreson | |
| 2,541,242 A | 2/1951 | Grove | |
| 4,405,212 A | 9/1983 | Cooper | |
| 4,654,899 A | 4/1987 | Harris | |
| 4,701,965 A | 10/1987 | Landis | |
| 5,339,119 A | 8/1994 | Gardner | |
| 5,388,269 A | 2/1995 | Griffin | |
| 5,771,500 A | 6/1998 | Mayes | |
| 6,481,845 B1 | 11/2002 | Gazzara | |
| 10,098,787 B2 | 10/2018 | Umentum et al. | |
| 10,532,879 B2 | 1/2020 | Ito et al. | |
| 10,687,981 B2 | 6/2020 | Calilung et al. | |
| 11,206,882 B1* | 12/2021 | Bornstein | A41D 13/1184 |
| 11,206,883 B1* | 12/2021 | Bornstein | A41D 13/1184 |
| 11,318,333 B1* | 5/2022 | Ellerbrake | A62B 23/02 |
| 11,497,262 B2* | 11/2022 | Bornstein | A41D 13/1184 |
| 2002/0029399 A1 | 3/2002 | Hill | |
| 2004/0025232 A1 | 2/2004 | Hartley et al. | |
| 2004/0051839 A1 | 3/2004 | Tagawa | |
| 2004/0117898 A1 | 6/2004 | Penque, Jr. et al. | |

(Continued)

*Primary Examiner* — Robert H Muromoto, Jr.
(74) *Attorney, Agent, or Firm* — Greenberg Traurig, LLP

(57) ABSTRACT

Face shields, eyewear, and kits which provide a user the ability to protect their face from solids or liquids while simultaneously providing the ability to manipulate any eyewear the user may desire to wear.

20 Claims, 17 Drawing Sheets

(56) References Cited

U.S. PATENT DOCUMENTS

| | | |
|---|---|---|
| 2006/0039813 A1* | 2/2006 | Thomas ................ F04B 39/125 |
| | | 417/571 |
| 2013/0014316 A1 | 1/2013 | Castro et al. |
| 2014/0318084 A1 | 10/2014 | Schultz |
| 2015/0351965 A1 | 12/2015 | Umentum et al. |
| 2022/0071324 A1* | 3/2022 | Bornstein .......... A41D 13/1184 |
| 2022/0110388 A1* | 4/2022 | Bornstein ................ G02C 9/02 |

* cited by examiner

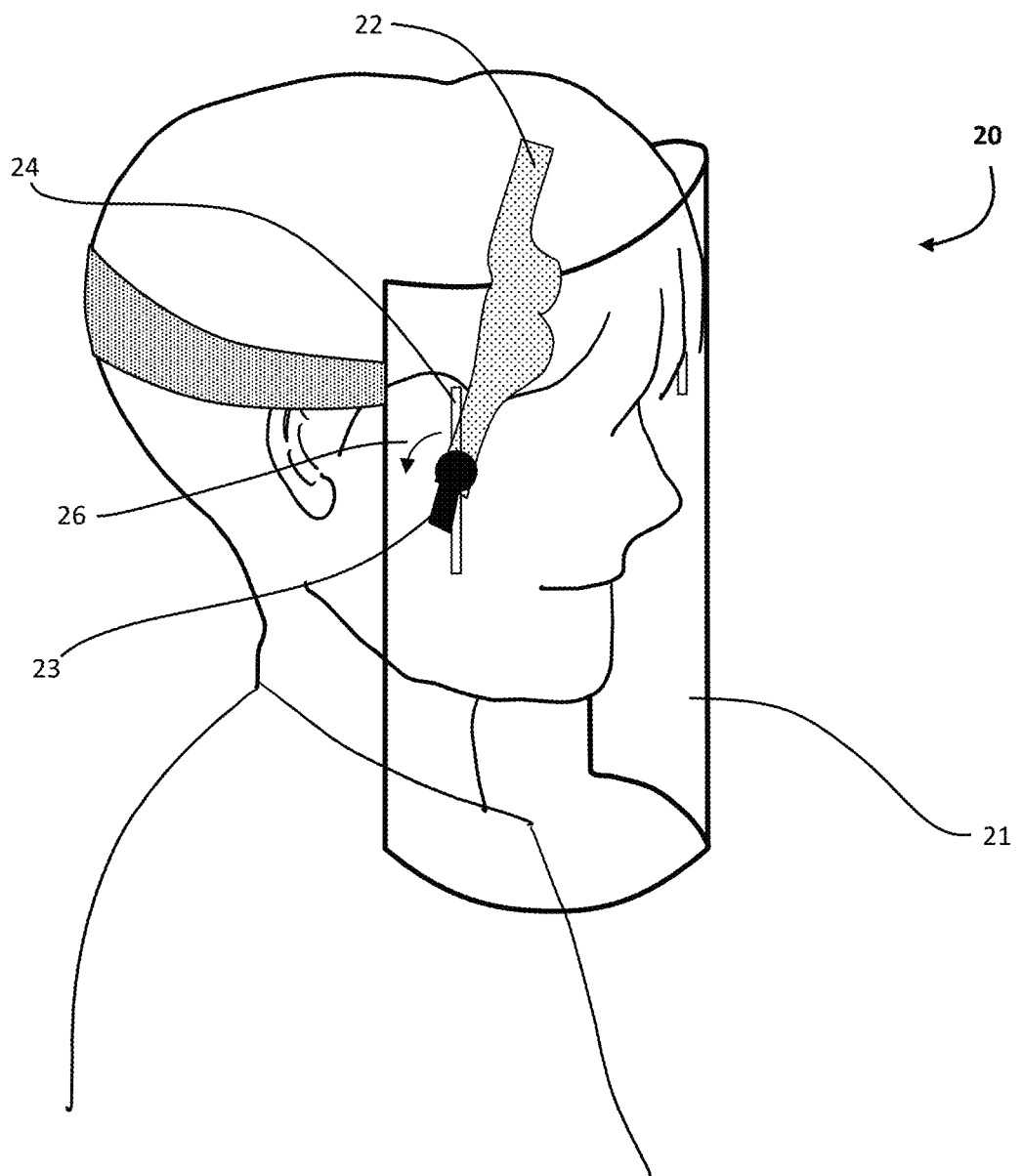

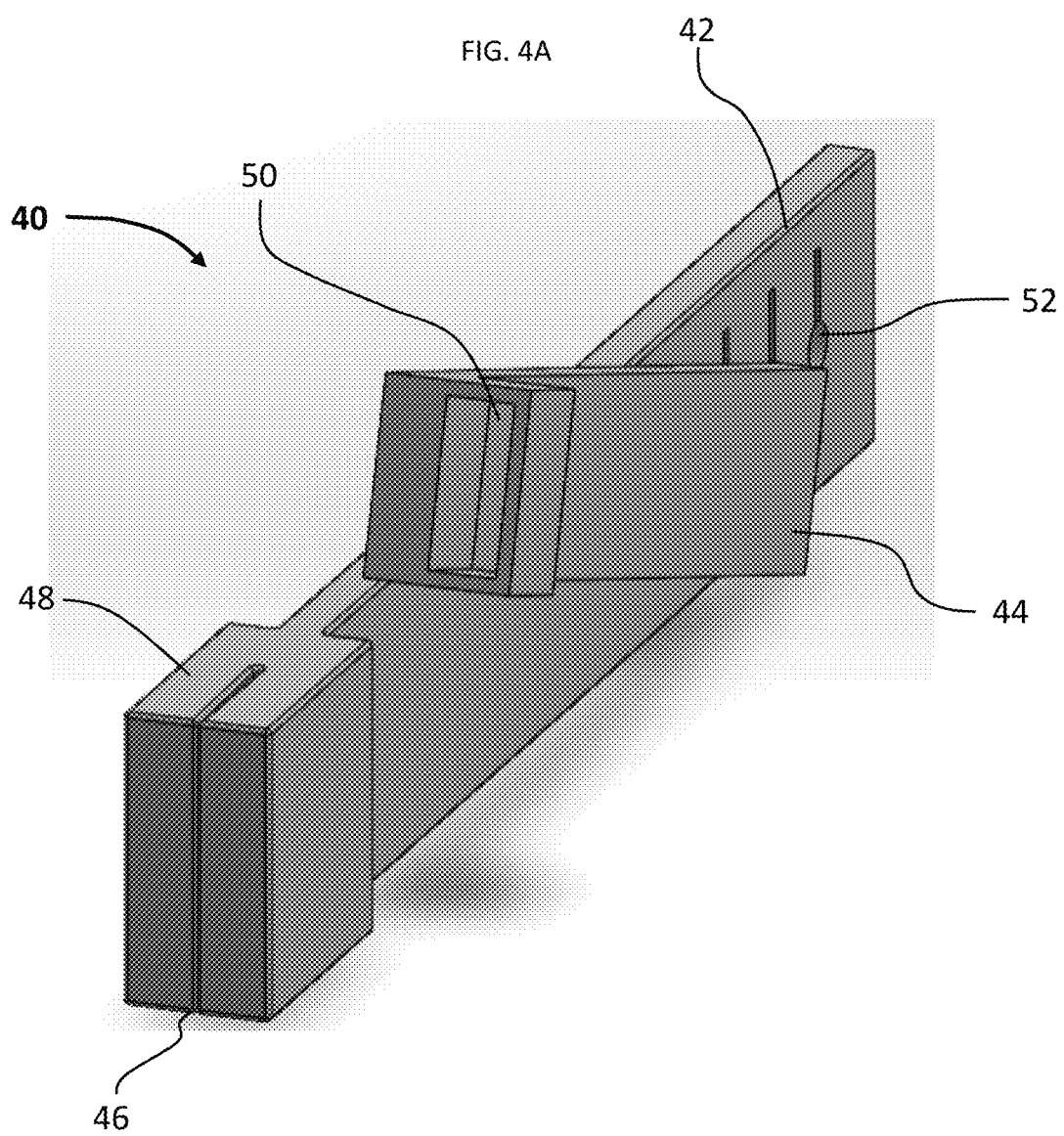

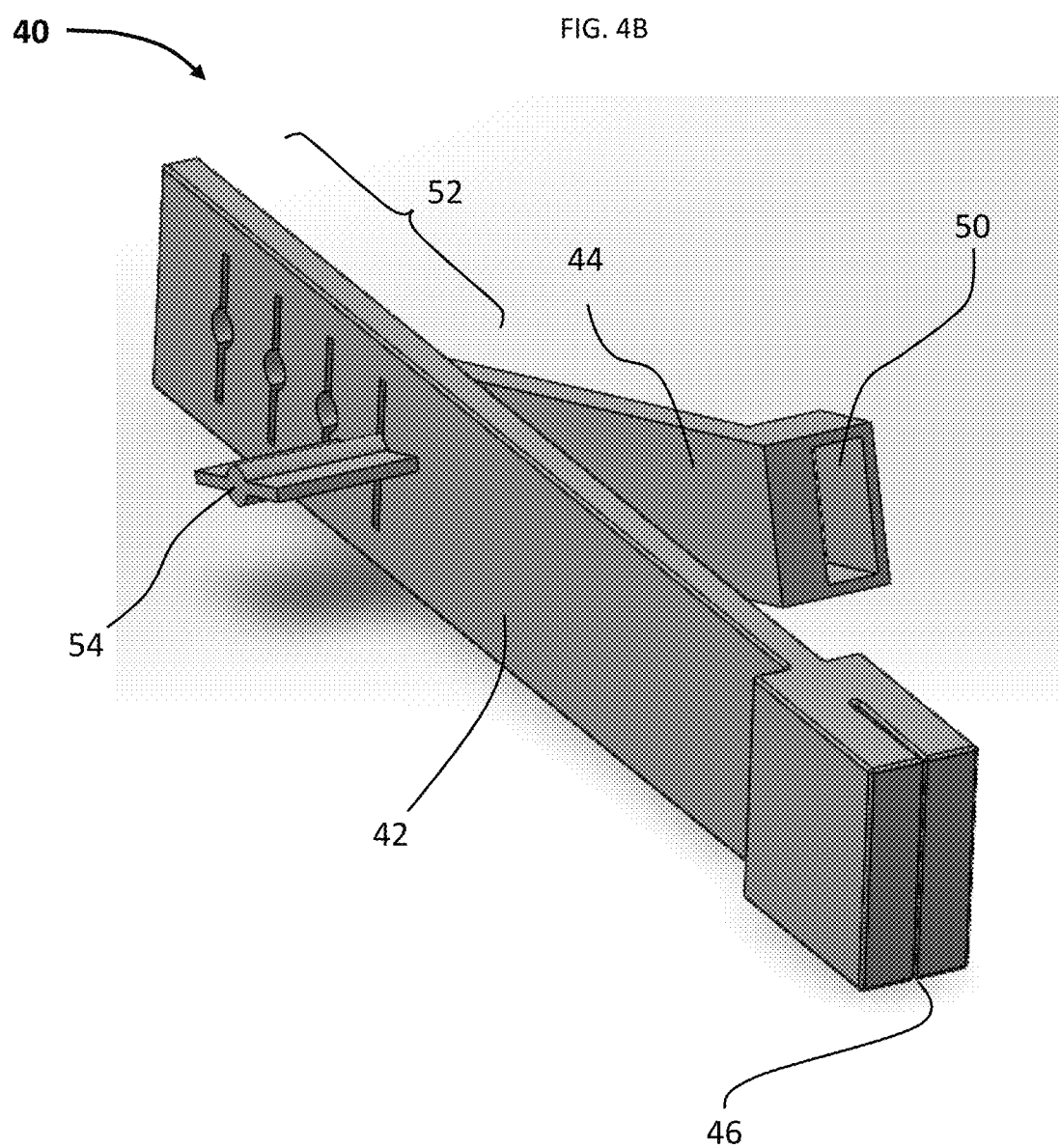

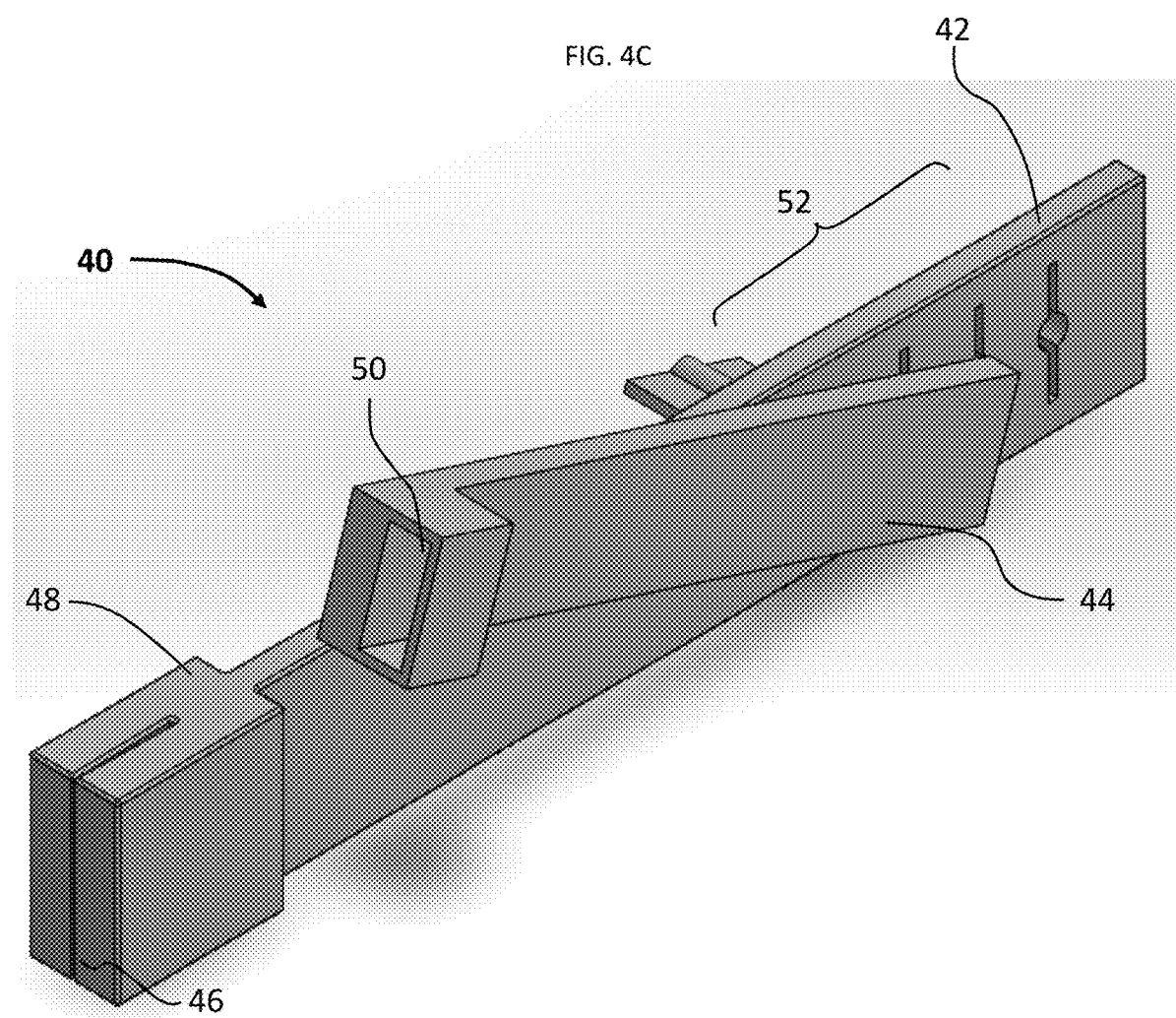

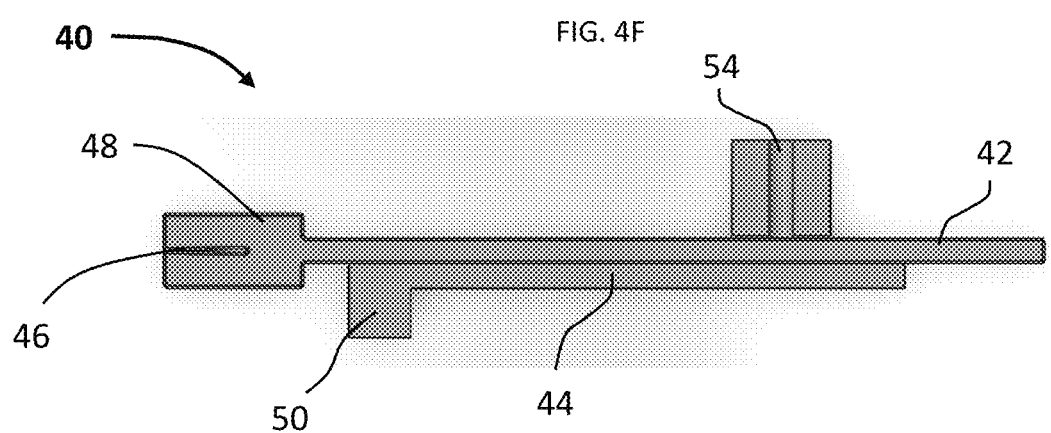

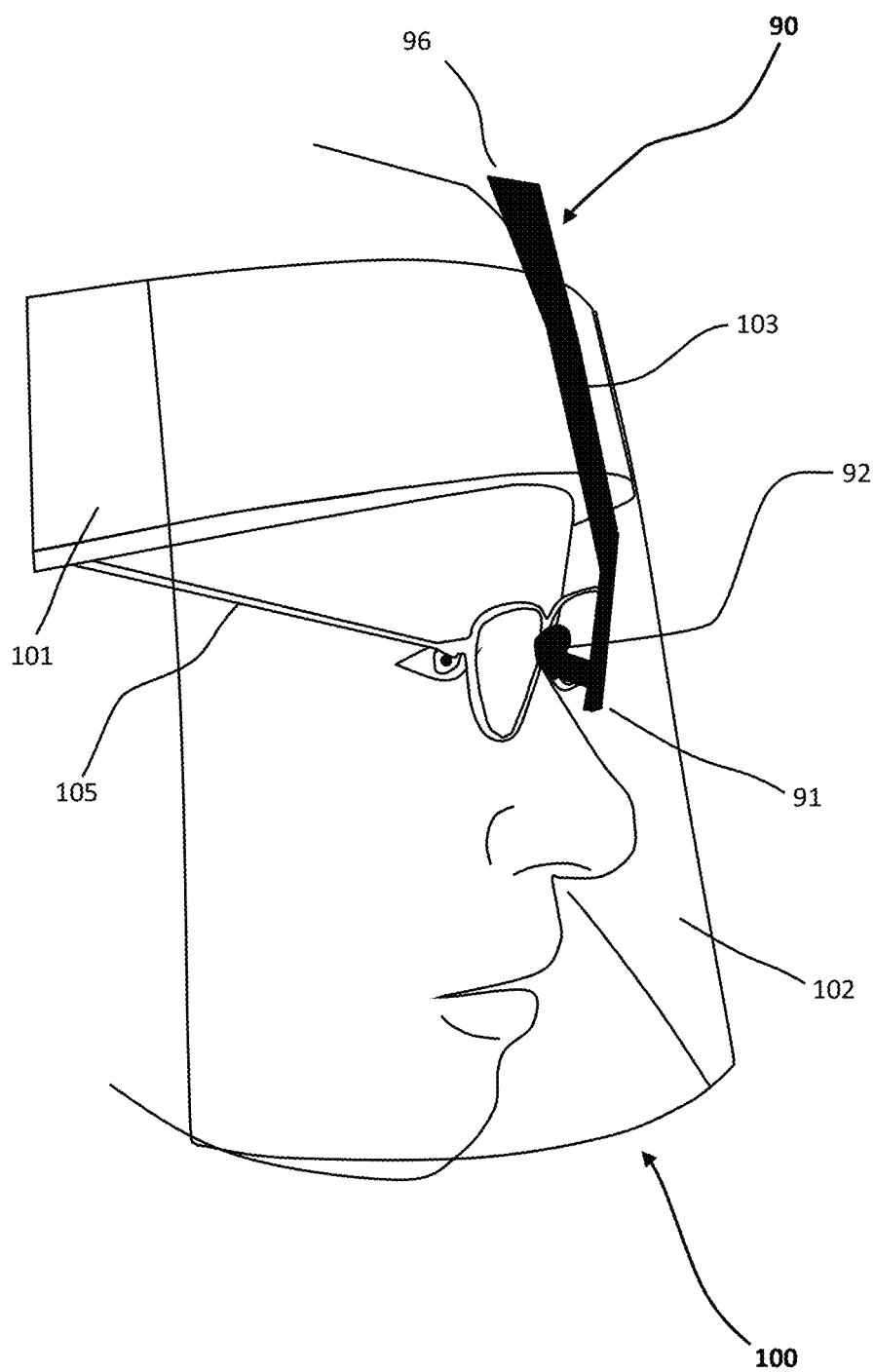

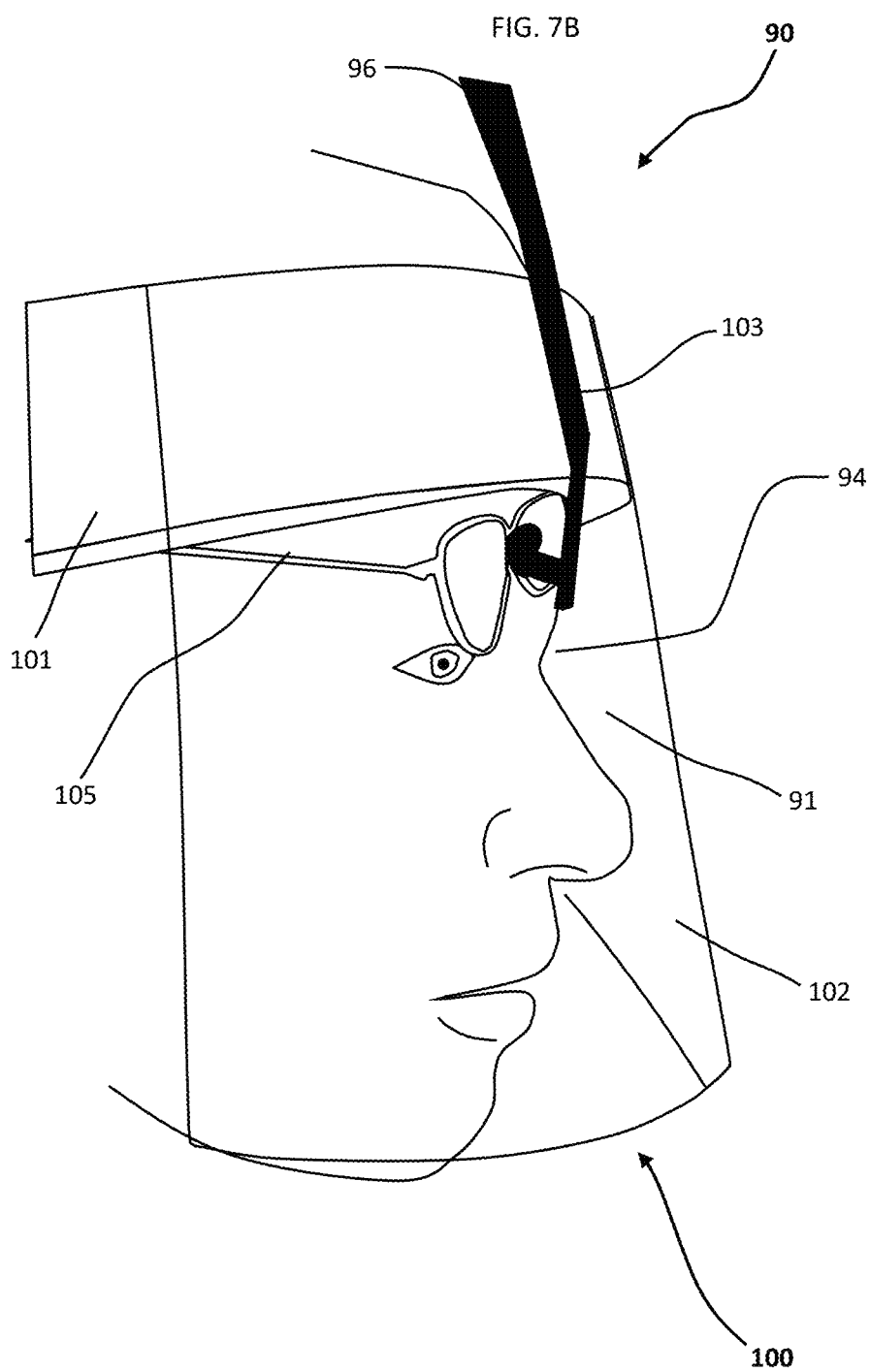

FACE SHIELD INTEGRATION WITH EYEWEAR

CROSS REFERENCE TO RELATED APPLICATIONS

This application is a continuation in part application claiming priority to and the benefit of U.S. application Ser. No. 17/558,576, filed Dec. 21, 2021, which is a continuation in part application of U.S. application Ser. No. 17/528,134, filed Nov. 16, 2021, which is a continuation application claiming priority to and the benefit of U.S. application Ser. No. 16/908,506, filed Jun. 22, 2020, which is a continuation application claiming priority to and the benefit of U.S. application Ser. No. 16/905,839, filed Jun. 18, 2020, each of which is hereby incorporated by reference in its entirety.

FIELD OF DISCLOSURE

The present disclosure is related to face shields allowing for the manipulation of eyewear without removal of the face shield.

BACKGROUND

Face shields provide a protective barrier for users desiring not to be exposed to various solid and liquid materials. For example, face shields are routinely used in the medical community to prevent the inhalation of airborne pathogens trapped in aerosolized particles of body fluid. Users also often want to wear some sort of eyewear to augment their vision (e.g., focusing light, block certain wavelengths of light, magnification) with use of these face shields. However, when eyewear is worn with face shields, the eyewear often becomes fogged as condensation accumulates on the lenses of the eyewear thereby inhibiting its utility. Moreover, prescription glasses could shift out of the desired location resulting in blurry vision, or the user may desire to take some eyewear such as reading glasses on or off while working. Often, in order to remove the condensation or to adjust glasses, a user is forced to remove the face shield as well. Removal of the face shield may compromise the integrity afforded by the device and/or require the user to wait until they are in an uncompromised situation before cleaning of the lenses can occur. Moreover, fogging of the eyewear is often uncomfortable for the user and inhibits the utility of these protective devices.

It is therefore an object of the present disclosure to provide face shields which limit these compromised and/or uncomfortable situations to allow for more continued use without removal.

SUMMARY

In accordance with the foregoing objectives and others, the present disclosure provides face shields whereby a user may move eyewear typically worn under a face shield without removal of the face shield itself. Accordingly, adjustments of eyewear are possible with the face shields of the present disclosure without compromising the prevention of inhalation of unwanted material (e.g., aerosolized pathogens) typically afforded by the face shield during use. It will be understood that the face shields of the present disclosure may include any device that prevents migration of foreign material to a user's face and covers the eyes including face masks and gas masks, unless otherwise indicated. In some embodiments, the face shield is a gas mask. In some embodiments, the face shield comprises a solid barrier that prevents the passage of solids and liquid therethrough, and a support strap which extends around the head of the user to position the solid barrier in front of the face of the user (e.g., to cover the eyes of a user and optionally the nose or the nose and the mouth of a user).

The face shields of the present disclosure may comprise a solid barrier that prevents the passage of solids and liquids therethrough; wherein
said solid barrier comprises one or more eyewear attachment elements configured to allow for an eyewear element to be removably attached to said solid barrier; and
said eyewear element comprises lenses which refract light into the eyes of a user wearing the face shield when the eyewear element is attached to the solid barrier.
In some embodiments, the face shield may comprise:
a) a solid barrier that prevents the passage of solids and liquids therethrough;
b) an eyewear attachment element configured to attach or removably attach to eyewear;
c) an eyewear movement element configured to allow movement of the eyewear with respect to the solid barrier when said eyewear is attached;
wherein the eyewear movement element is configured such that attached eyewear may be moved into a first position where the lenses of the eyewear are positioned between the solid barrier and the eyes of a user wearing the face shield;
the attached eyewear may be moved into a second position where the lenses of the eyewear are not positioned between the solid barrier and the eyes of a user wearing the face shield; and
movement of the eyewear from the first position to the second position can be effectuated without removal of the face shield from the face of a user.
In various implementations, the face shield may comprise:
a) a solid barrier that prevents the passage of solids and liquids therethrough;
b) eyewear comprising a bridge between lenses; wherein the bridge is configured to separate the eyewear into a first portion and a second portion; wherein the first portion and the second portion each comprises a lens and a temple frame of the eyewear; and
said bridge comprises a bridge attachment element to attach the first portion and the second portion together;
c) an eyewear movement element (e.g., swivel, hinge) configured to move the first portion or the second portion to a position where the lens of the portion attached to the eyewear movement element is not positioned between the solid barrier and the eyes of a user wearing the face shield;
wherein when the first portion and the second portion are attached at the bridge, the lenses of the eyewear are positioned between the solid barrier and the eyes of a user wearing the face shield; and
movement of the eyewear portion can be effectuated without removal of the face shield from the face of a user.

The disclosure also relates to eyewear element dimensioned for use with the face shields as described herein. Typically, the eyewear element comprises a frame which may attach (e.g., removably attach) to one or more lenses, and be dimensioned to be attached to the face shields of the present disclosure and/or comprise one or more attachment elements such that the eyewear element can be configured to attach to a face shield during use. In some embodiments, the eyewear element comprises a frame dimensioned to be supported by the nose of a user. In some embodiments, the eyewear comprises a separable bridge section, wherein the eyewear may be separated into two portions each comprising a lens. The eyewear may comprise a movement element (e.g., hinge) located in the frame (e.g., temple) such that the two portions may be separated. Each portion may comprise, for example, a lens and a temple. In some embodiments, each portion may comprise, for example, a lens, a temple, and a temple tip. When integrated with the face shields of the present disclosure, the two portions may be separated and independently moved to positions where the lenses may be cleaned.

Kits are also provided comprising face shields of the present disclosure and eyewear elements for use therewith. In some embodiments, the kit may comprise:
 a) a solid barrier that prevents the passage of solids and liquids therethrough; wherein the solid barrier comprises one or more eyewear attachment elements configured to allow for an eyewear element to be removably attached to said solid barrier; and
 b) an eyewear element capable of being removably attached to the solid barrier comprising lenses which refract light into the eyes of a user wearing the face shield when the eyewear element is attached to the solid barrier.

An apparatus which may be used to attach to face shields and afford the eyewear movement functionality of the present disclosure is also disclosed. The apparatus may comprise:
 a) an eyewear attachment element configured to removably attach to eyewear;
 b) an eyewear movement element configured to allow movement of the eyewear with respect to the solid barrier when said eyewear is attached;
 c) a solid barrier attachment element configured to removably attach to the solid barrier of a face shield;
wherein said eyewear movement element is configured such that attached eyewear may be moved into a first position (e.g., via a swivel) where the lenses of the eyewear are positioned between the solid barrier and the eyes of a user wearing the face shield with the apparatus attached thereto; the attached eyewear may be moved into a second position (e.g., via the swivel) where the lenses of the eyewear are not positioned between the solid barrier and the eyes of a user wearing the face shield with the apparatus attached to the solid barrier; and
movement of the eyewear from the first position to the second position can be effectuated without removal of the face shield from the face of a user. For example, the apparatus may have a base portion comprising said solid barrier attachment element and a rotation portion comprising said eyewear attachment element at an end thereof;
wherein said rotation portion is attached to said base portion by a swivel. In some embodiments, the swivel is formed from a post which extends through said base portion comprises a point of attachment for said post; or said swivel is formed from a post which extends through said rotation portion and said base portion comprises a point of attachment for said post. In various implementations, the post may be a screw comprising a threaded portion and said point of attachment is a threaded hole dimensioned for said screw.

The base portion may provide the required support for rotation of the eyewear in its sole point of attachment to the solid barrier. The base portion may include additional functional features to effect rotation of the eyewear including several attachment points to the rotation. The base portion may comprise a plurality of holes independently threaded and unthreaded, and wherein said each of said holes in said plurality of holes (e.g., two, three, four, five, six) is dimensioned for insertion of a post to form the swivel. In some embodiments, the base portion comprises a major longitudinal axis and said solid barrier attachment element (e.g., a clip) is at a distal end of said base portion along the major longitudinal axis. The base portion may comprise a plurality of holes dimensioned for insertion of a post to form the swivel; wherein said plurality of holes are positioned along the major longitudinal axis. The plurality of holes may afford different axes of rotation selectable by a user in order to fit the user's head, eyewear, and face shield. For example, the base portion may be dimensioned such that temple tips of the eyewear in said first position are supported by a user's ears wearing said face shield. It may have a length along the major longitudinal axis of, for example, from 1 cm to 10 cm or from 3 cm to 8 cm or from 1 cm to 8 cm or from 2 cm to 6 cm. In some embodiments, the distance between the solid barrier attachment element and at least one hole is from 1 cm to 10 cm or from 3 cm to 8 cm or from 1 cm to 8 cm or from 2 cm to 6 cm. The base portion may comprise a plurality of holes dimensioned for insertion of a post to form the swivel; wherein said plurality of holes are positioned along the major longitudinal axis at the end of the base portion opposite the distal end comprising the solid barrier attachment element.

The apparatus may also be configured to attach to a face shield between the solid barrier and a head support attached to the solid barrier. For example, the apparatus may comprise:
 a) an eyewear attachment element to removably attach to eyewear;
 b) a solid barrier attachment element to be inserted between a head support of a face shield and the solid barrier of a face shield (e.g., a soft material such as a foam piece extending across the portion of the solid barrier and above the bridge of the nose of a user);
 c) a distal end opposite from the eyewear attachment element;
wherein the apparatus is dimensioned such that when inserted between the solid barrier and the head support, eyewear attached to the eyewear attachment element can be positioned in a first position where the lenses of eyewear are positioned between the solid barrier and the eyes of a user wearing the face shield and the distal end extends above the head support. In some embodiments, the eyewear attachment element comprises a hook and a wall, and
the space within the curvature of the hook and the wall is dimensioned to accommodate the bridge of the eyewear;
the hook is curved towards the distal end and can provide support to the bottom of the bridge of the eyewear; and
the wall extends along the width of the apparatus to provide support to the top of the bridge of the eyewear. The configuration of the hook and wall may be adopted to allow for insertion and support for the bridges of eyewear. For example, the hook may be a rounded hook having a circular cross section with a radius of from 1 mm to 2 cm (e.g., 5 mm to 1.5 cm). In some embodiments, the wall may extend across the width of the base portion and has a height of from 1 mm to 5 cm (e.g., 5 mm to 3 cm, 5 mm to 2 cm, 5 mm to 3 mm). In certain aspects, the wall and the hook are separated by a distance of from 5 mm to 3 cm (e.g., from 5 mm to 2 cm, from 5 mm to 1 cm from 1 cm to 2 cm). In various implementations, the hook and/or wall are formed of a pliable material such that the hook and/or wall may be moved during insertion of the bridge of the eyewear to open a space for eyewear to be inserted into the space, however, once the eyewear is inserted, the wall and/or hook moves back to their typical position to support the eyewear. In some embodiments, the wall may have a lip angled towards the hook to provide additional support and attachment to the eyewear. In some embodiments, the apparatus comprises the eyewear (e.g., the eyewear is non removably attached to the apparatus).

Attaching some apparatuses of the disclosure to a face shield may require leveraging common features of many face masks such as head supports (e.g., foam) attached to the solid barrier and their adhesion to the solid barrier. For example, the apparatuses of the present disclosure may attach to the solid barrier by insertion between the head support and the solid barrier such that each supplies a normal force to the apparatus thereby keeping the apparatus and eyewear in a desired position. Increasing normal forces on the apparatus from these portions when the apparatus is inserted therebetween may allow for more user control of the engagement between the apparatus and the face shield. For example, a side of the apparatus (e.g., opposite from the eyewear attachment element) may comprise a flat surface having one or more notches (e.g., chamfered notches) which would engage with the solid barrier. In some embodiments, the side of the apparatus opposite from the eyewear attachment element may a hook to attach to the top of the solid barrier when the eyeglasses are in the first position or positioned above the eyes of the user.

The apparatus may comprise a base portion having a major longitudinal axis;

wherein the eyewear attachment element comprises a hook and wall positioned to accommodate the bridge of the eyewear in the space therebetween; wherein the hook and wall are positioned at the distal end of the base portion on the surface of the base portion; and the opposite surface of the base portion comprises a flat surface having one or more notches. The height of the base portion (e.g., the distance between each flat surface) may be dimensioned to be inserted between the head support of a face shield and the solid barrier of a face shield (e.g., a foam piece extending across the portion of the solid barrier and above the bridge of the nose of a user) and the one or more notches are dimensioned to inhibit movement of the apparatus when inserted therein. The height of the base portion (and/or notches on the base portion) may be chosen to allow the head support (e.g., foam) shape around the insert minimizing separation induced between the head support and the face shield. In some embodiments, the base portion has a height such that when inserted into the space between the solid barrier and the head support (e.g., foam), there is minimal alteration of the exterior surface of the face shield (e.g., less than 1% change in the exterior surface in any dimension such as curvature). In some embodiments, the head support may be cut in order to minimize the separation between the head support and the face shield and accommodate the apparatus. In some embodiments, the height of the base portion is less than (or from 0.05 mm to) 1 cm. In some embodiments, the height of the base portion is between 0.5 mm and 2 cm (e.g., 0.5 mm and 1 cm, 0.5 mm and 5 mm, 0.5 mm and 3 mm). In various implementations, the height of the one or more notches may be independently from 0.5 mm to 2 cm (e.g., from 0.5 mm to 0.5 cm, from 0.5 mm to 5 mm, from 0.5 mm to 3 mm).

In some embodiments, the height of the notches is less than (or from 0.05 mm to) 1 cm. In some embodiments, the height of the base portion and the notches is less than (or from 0.05 mm to) 2 cm. In some embodiments, the notches are chamfered. In various aspects, the length of the base portion (e.g., the distance between each distal end along the major longitudinal axis) may be from 5 cm to 30 cm (e.g., from 5 cm to 25 cm, from 5 cm to 20 cm, from 5 cm to 15 cm, from 5 cm to 10 cm, from 10 cm to 15 cm, from 10 cm to 20 cm, from 10 cm to 25 cm, from 15 cm to 25 cm, from 15 cm to 20 cm, from 20 cm to 25 cm). In some embodiments, the width (e.g., the width of the base portion on the axis perpendicular to the major longitudinal axis and at the center point along the major longitudinal axis) is from 1 mm to 5 cm (e.g., 5 mm to 3 cm, 5 mm to 2 cm, 5 mm to 3 mm). In some embodiments, the hook may be a rounded hook (e.g., having a rounded cap) and a circular cross section with a radius of from 1 mm to 2 cm (e.g., 5 mm to 1.5 cm). In some embodiments, the wall may extend across the entire width of the base portion or substantially the entire width (e.g., more than 90% more than 95% more than 99% of the width of the base portion) and has a height of from 1 mm to 5 cm (e.g., 5 mm to 3 cm, 5 mm to 2 cm, 5 mm to 3 mm). In various embodiments, the hook may extend from the surface a distance of from 0.5 mm to 3 cm (e.g., 0.5 mm to 1.5 cm, 1 cm to 2 cm).

Objects having a major longitudinal axis typically have a cross sectional dimension along one axis (the major longitudinal axis) than in the orthogonal axis (the minor longitudinal axis). These objects may adopt many configurations. For example, in some embodiments, the base portion is rectangular and/or the cross section of the rotation portion is rectangular, parallelepiped, circular, ovoid, rhomboid, trapezoidal, or combinations thereof. In various implementations, the major longitudinal axis is an axis of symmetry. In some embodiments, the rotation portion comprises a major longitudinal axis and said eyewear attachment element (e.g., a port) is at a distal end of said rotation portion along the major longitudinal axis.

BRIEF DESCRIPTION OF FIGURES

FIG. 2C is an illustration of a user wearing a face shield of the present disclosure wherein the eyeglass element has been moved to be positioned away from the eyes of the user.

FIGS. 4A-4F are illustrations of different views of an apparatus for attachment to the solid barrier of a face shield to allow movement of eyewear as disclosed herein. In FIG. 4D, the black dashed line shows the major longitudinal axis of the base portion and the white dashed line shows the major longitudinal axis of the rotation portion.

FIG. 7A is an illustration of a user having a face shield with an apparatus designed to effectuate movement by attachment between the head support of the face shield and the solid barrier of the face shield. In FIG. 7A, the eyewear is positioned in front of the user's eyes.

FIG. 7B is an illustration of the user in FIG. 7A with the apparatus positioned away from the user's eyes by movement of the apparatus via the distal end protruding above the head support.

DETAILED DESCRIPTION

Detailed embodiments of the present disclosure are disclosed herein; however, it is to be understood that the disclosed embodiments are merely illustrative of the disclosure that may be embodied in various forms. In addition, each of the examples given in connection with the various embodiments of the disclosure is intended to be illustrative, and not restrictive.

All terms used herein are intended to have their ordinary meaning in the art unless otherwise provided. All concentrations are in terms of percentage by weight of the specified component relative to the entire weight of the topical composition, unless otherwise defined.

As used herein, "a" or "an" shall mean one or more. As used herein when used in conjunction with the word "comprising," the words "a" or "an" mean one or more than one. As used herein "another" means at least a second or more.

As used herein, all ranges of numeric values include the endpoints and all possible values disclosed between the disclosed values. The exact values of all half integral numeric values are also contemplated as specifically disclosed and as limits for all subsets of the disclosed range. For example, a range of from 0.1% to 3% specifically discloses a percentage of 0.1%, 1%, 1.5%, 2.0%, 2.5%, and 3%. Additionally, a range of 0.1 to 3% includes subsets of the original range including from 0.5% to 2.5%, from 1% to 3%, from 0.1% to 2.5%, etc. It will be understood that the sum of all % of individual components will not exceed 100%.

The face shields of the present disclosure afford the ability for a user to manipulate eyewear while wearing a face shield, and to do so without removing the face shield. This may allow for a user to keep the face shield on for longer amounts of time without issues relating to the eyewear.

Figure 1A:
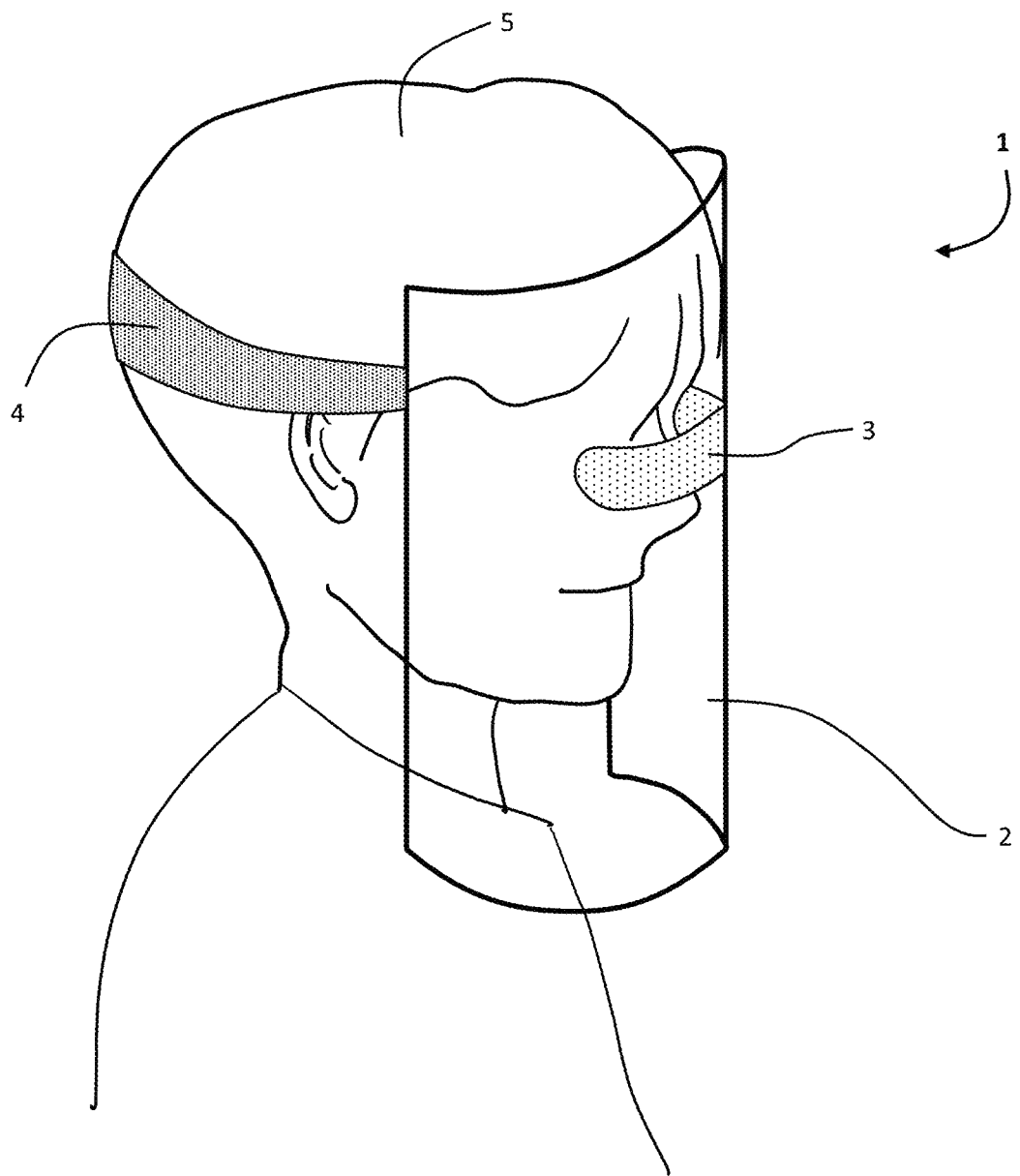
FIG. 1A is an illustration of a user wearing a face shield of the present disclosure.
Figure 1B:
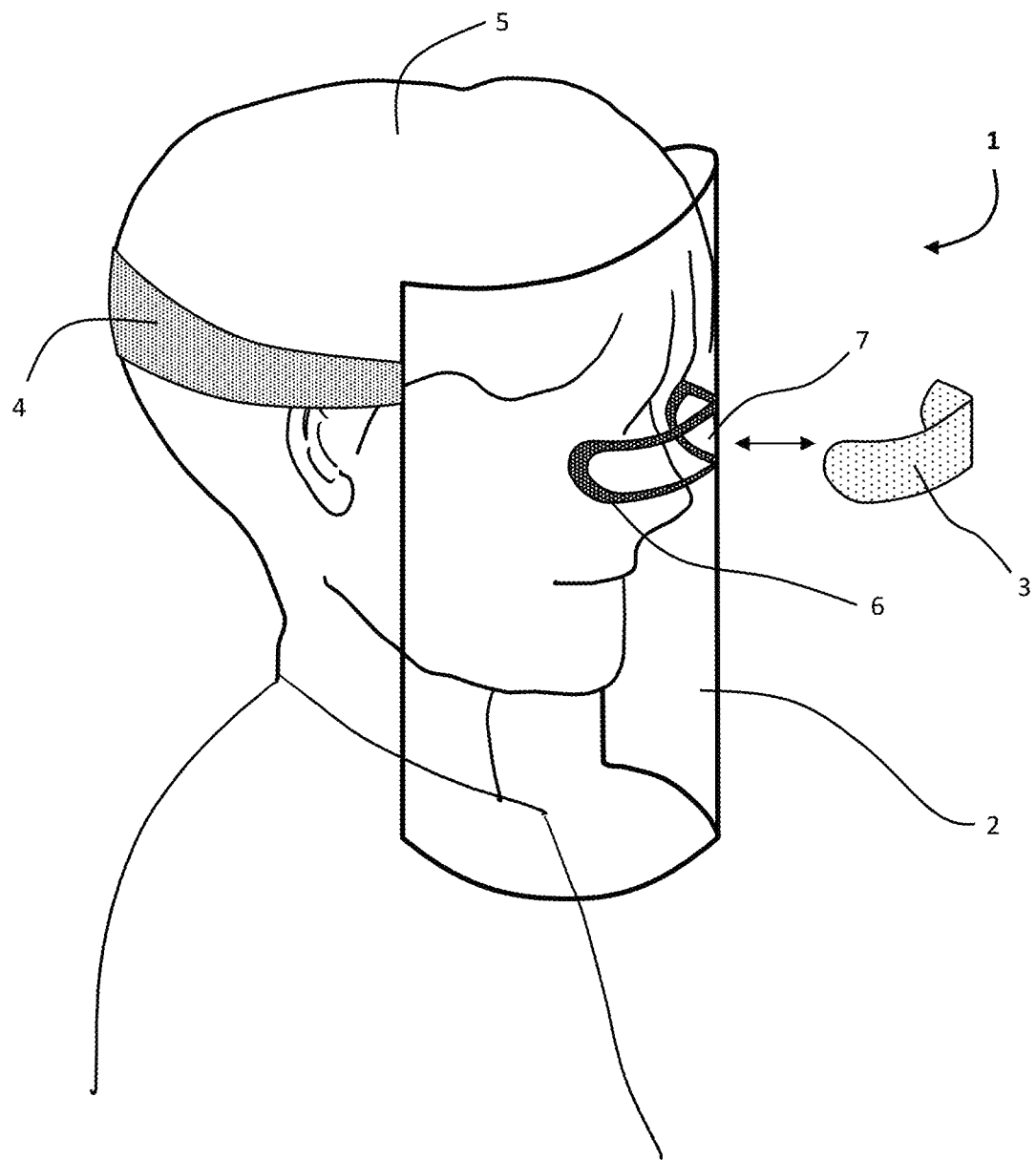
FIG. 1B is an expanded illustration of the face shield of FIG. 1A.

In some embodiments, the face shield may comprise a shield comprising a solid barrier that prevents the passage of solids and liquids therethrough; wherein the solid barrier comprises one or more eyewear attachment elements configured to allow for an eyewear element to be removably attached to said solid barrier; and the eyewear element comprises lenses which refract light into the eyes of a user wearing the face shield when the eyewear element is attached to the solid barrier. Referring now to FIGS. 1A and 1B, face shield 1 comprises solid barrier 2 which is dimensioned such that the eyes, nose, and mouth of user 5 are shielded from solids and liquids passing through solid barrier 2. Face shield 1 comprises strap 4 which extends around the head of user 5 providing support for solid barrier 2 over the face of user 5. Face shield 5 comprises an eyewear element 3 positioned proximal to the eyes of the user such that light may pass through (e.g., refract) through eyewear element 3 and into the eyes of user 5. Refraction through eyewear element 3 may occur in a prescriptive sense, for example, such that eyewear element 3 may comprises one or more lenses which reflect light in a manner to correct the vision of user 5. In some embodiments, the lens may produce a magnified image to the user (e.g., such as lenses used in reading glasses). As can be seen in FIG. 1B, eyewear element 3 is removably attached to the external surface of solid barrier 2. Solid barrier 2 comprises one or more eyewear attachment elements 7 (e.g., adhesive, snaps, loop and hook configurations such as Velcro®) which allow eyewear element 3 to be removably attached to solid barrier 2. Solid barrier 2 may further comprise a cavity 7 surrounded having one or more eyewear attachment elements 7 at the perimeter of the cavity, therefore allowing light to pass only through the eyewear element and into the eyes of user 5.

Figure 2A:
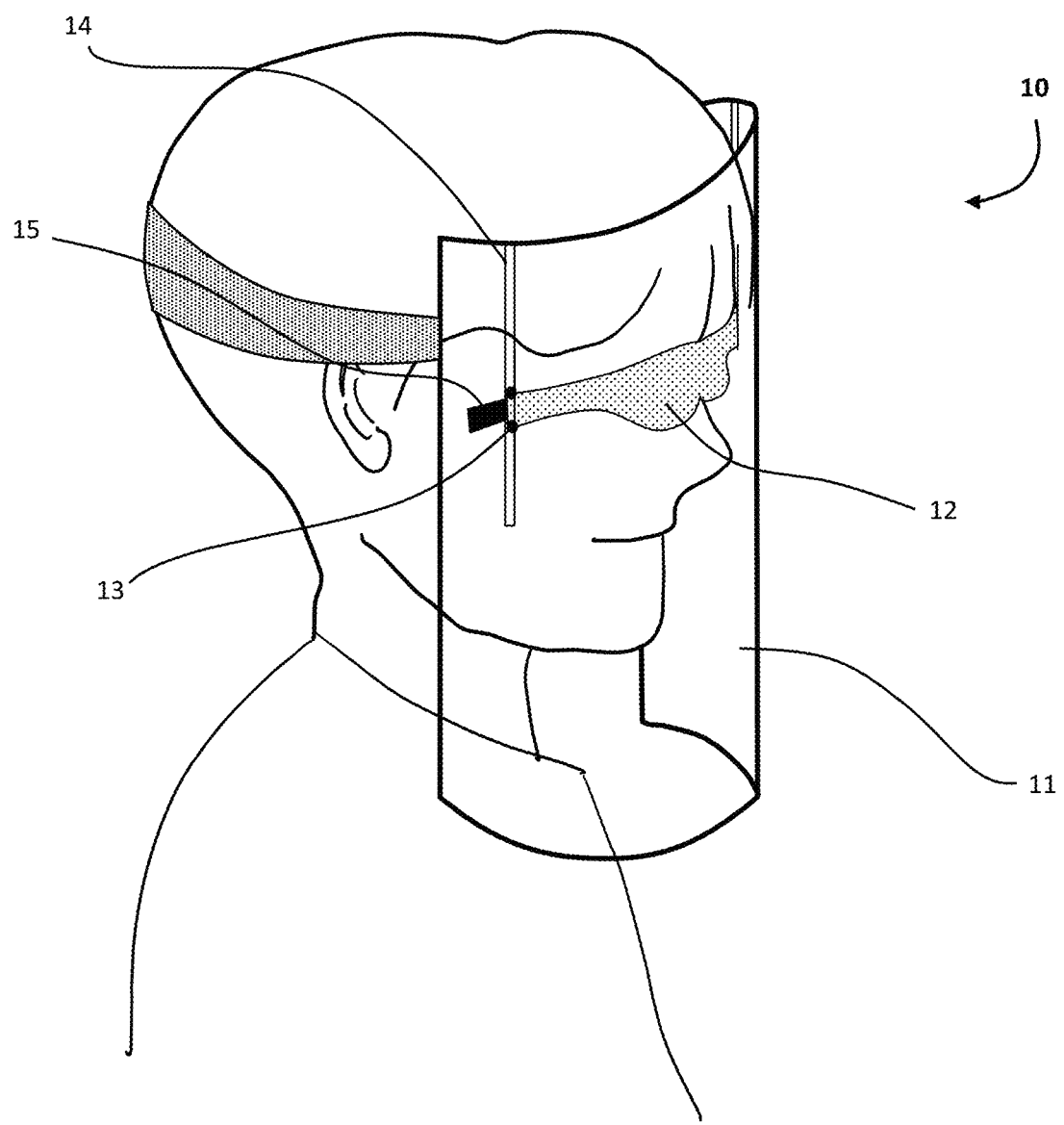
FIG. 2A is an illustration of a user wearing a face shield of the present disclosure where the eyeglass element is positioned to allow light to pass therethrough to the user's eyes.
Figure 2B:
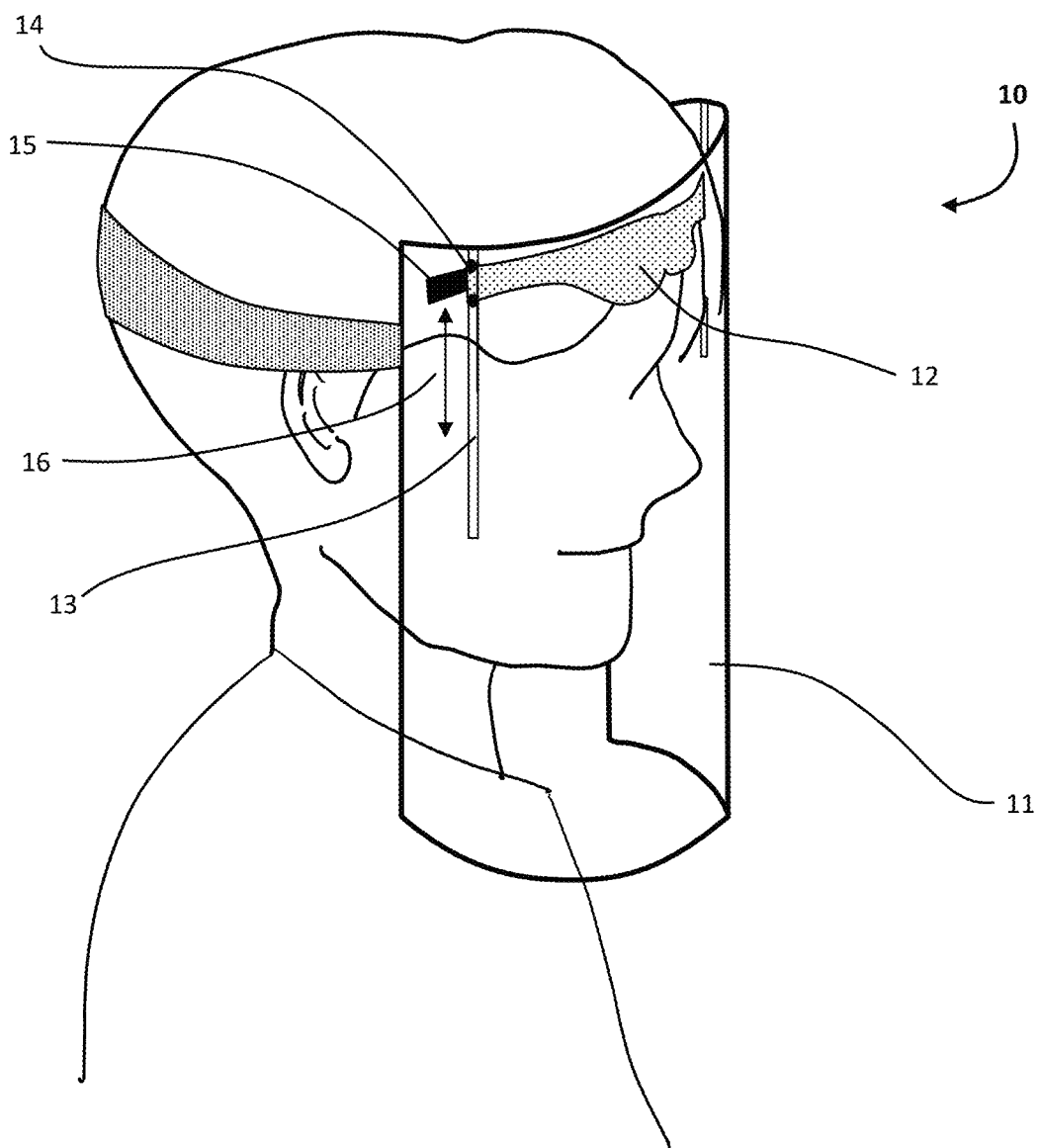
FIG. 2B is an illustration of a user wearing the face shield of FIG. 2A, wherein the eyeglass element has been moved to be positioned away from the eyes of the user.

The eyewear element may be attached at various positions of the solid barrier such that light may pass through both the solid barrier and the eyewear element. For example, the solid barrier may not comprise a cavity. In certain embodiments, the eyewear element is removably attached to the solid barrier such that the eyewear element is positioned between the solid barrier and the user's eyes. Referring now to FIGS. 2A and 2B, face shield 10 comprises solid barrier 11 which is removably attached to eyewear element 12. Eyewear element 12 is removably attached with one or more attachment elements 13 such as screws, nuts, and/or snaps. Eyewear element 12 fits into port 14 of solid barrier 11 allowing for eyewear element 12 to be positioned between solid barrier 11 and the user's eyes in a position similar to typical glasses wear. Eyewear element 12 may comprise handle 15. A user may grip handle 15 to allow eyewear element 12 to be moved away from the eyes by moving eyewear element 12 along port 14. As can be seen in FIG. 1B, eyewear element 12 may be moved away from the eyes along direction 16 by following the track of port 14.

The eyewear attachment elements may be configured for the eyewear element to be attached along the surface of the solid barrier where light passes through the solid barrier. In some embodiments, the light refracted through the lenses does not pass through the solid barrier when the eyewear element is attached to the solid barrier (e.g., the eyewear element is positioned within a cavity on the exterior surface of the face shield). In various implementations, the eyewear attachment elements are configured for the eyewear element to be attached and positioned between the solid barrier and a user's eyes when attached to the solid barrier (e.g., the eyewear element is positioned on the interior surface of the face shield, the eyewear element is positioned across the volume between the solid barrier and the users eyes and the attachment elements are on the sides of the face shield).

Other movement paradigms of eyewear elements during use of the face shields of the present disclosure are also possible. Referring now to FIG. 2C, face shield 20 comprises solid barrier 21 having port 24 which allows for insertion of eyewear element 22 in a configuration similar that depicted in FIG. 2A. Attachment element 23 allows for the rotation 26 of eyewear element 22 away from the eyes of the user. In certain embodiments, the eyewear element may be removably attached such that it may be removed from the face shield (e.g., by removal through a port) during use without removal of the face shield from the user. In certain implementations, the eyewear element may be rotated out of the volume between the solid barrier and the user's face without removal of the face shield. Such embodiments may allow for the cleaning of the eyewear element (e.g., to remove condensation that has collected on the lenses) and/or repositioning of the eyewear element without compromising the integrity afforded by the solid barrier.

Figure 3A:
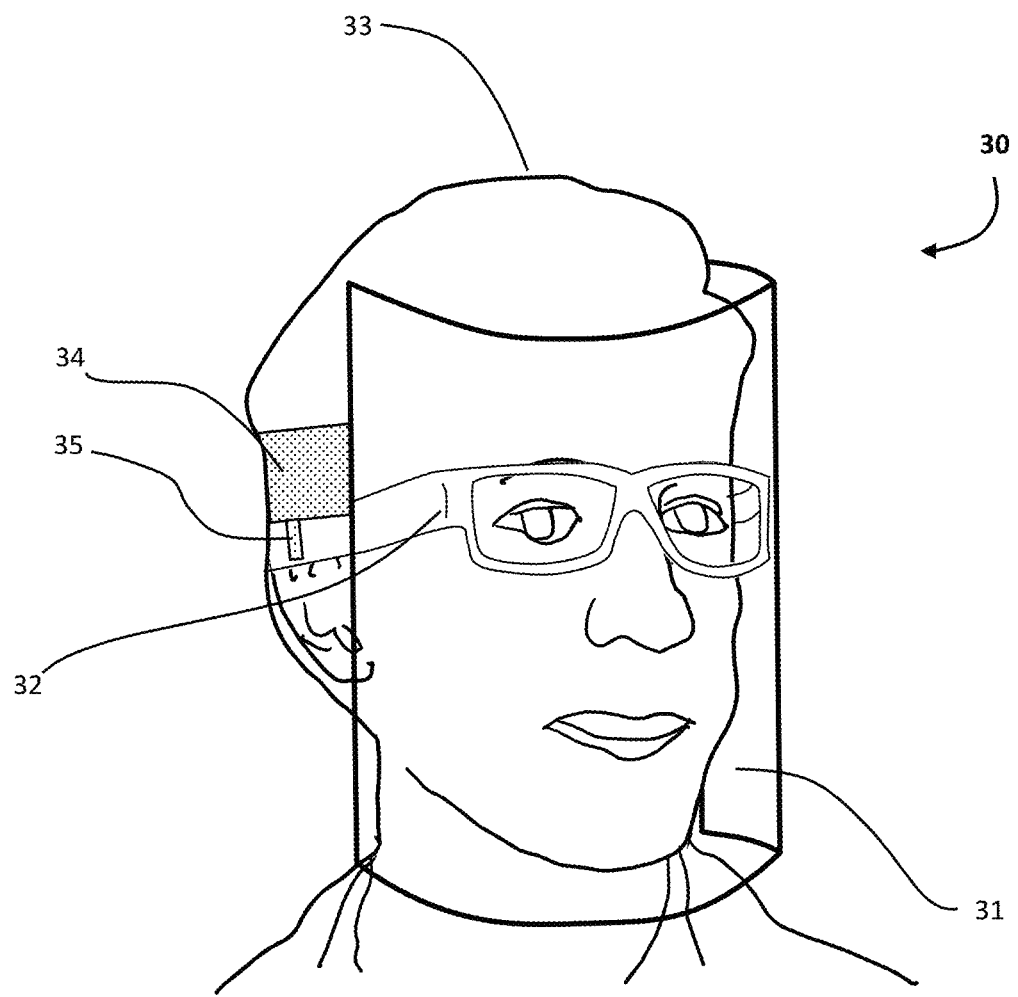
FIG. 3A is an illustration of a user wearing a face shield of the present disclosure attached to eyeglasses of the user in their typical position for use.
Figure 3B:
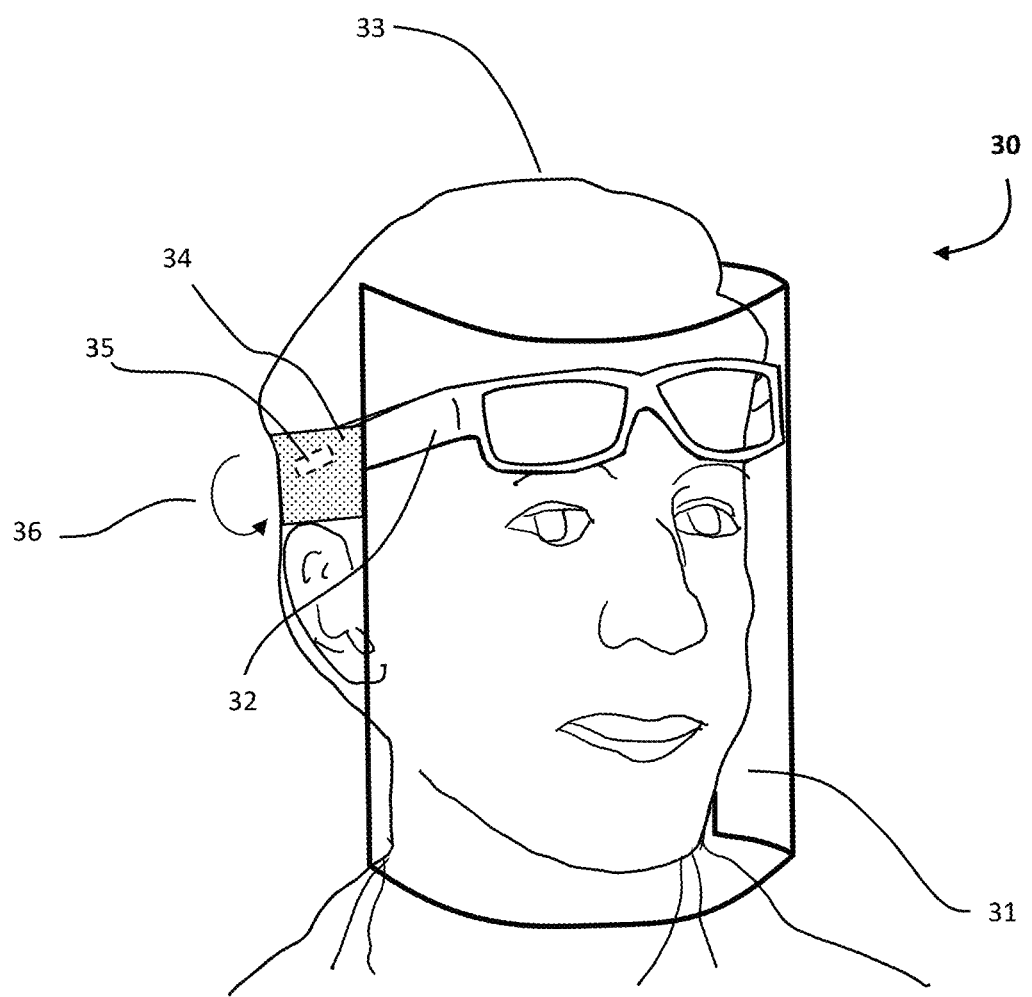
FIG. 3B is an illustration of user wearing the face shield of FIG. 3A, wherein the eyeglass have been moved away the eyes.

In certain implementations, the face shield may comprise:
a) a solid barrier that prevents the passage of solids and liquids therethrough;
b) an eyewear attachment element configured to attach or removably attach to eyewear;
c) an eyewear movement element configured to allow movement of the eyewear with respect to the solid barrier when said eyewear is attached;
wherein said eyewear movement element is configured such that attached eyewear may be moved into a first position where the lenses of the eyewear are positioned between the solid barrier and the eyes of a user wearing the face shield; the attached eyewear may be moved into a second position where the lenses of the eyewear are not positioned between the solid barrier and the eyes of a user wearing the face shield; and
movement of the eyewear from the first position to the second position can be effectuated without removal of the face shield from the face of a user. Referring now to FIG. 3A, a face shield 30 having solid barrier 31 is depicted being worn by user 33 with eyewear 32. The face shield is supported by strap 34 which extends around the head of user 33. Eyewear 32 is attached (e.g., removably attached) to face shield 30 with one or more attachment elements 35. The attachment element may comprise ports designed to grip the frame of the eyewear such as those comprising hook and loop construction (e.g., Velcro®), adhesive, loops, clips, hooks, those which rely on frictional forces (e.g., rubber port) or combinations thereof. Attachment element 35 is attached to a movement element allowing for rotation of the eyewear away from the eyes of the user. As shown in FIG. 3B, the face shield comprises a movement element (not depicted) such as a ratchet or swivel located at the back of the head. The movement element is in communication with the attachment element allowing for a user to rotate 36 the eyewear 32 into a position away from the user's eyes without removal of the face shield.

In some embodiments, the eyewear is glasses (e.g., prescription glasses, reading glasses). The movement element may be configured to rotate the eyewear in the plane of facial symmetry (e.g., the glasses are rotated to the forehead of the user in the second position) as illustrated, for example, in FIG. 3B. In various implementations, the movement element is configured to allow linear movement of the eyewear element such as illustrated, for example, in FIG. 2B. In some embodiments, the movement element may be configured to rotate the eyewear in a plane substantially perpendicular to the plane of facial symmetry (e.g., the rotation plane has an angle with the facial symmetry plane of from 80° to 100°) as illustrated, for example, in FIG. 2C. In some embodiments, the face shield may comprise a handle removably attached to the frame of the eyewear, wherein the handle extends above the top portion of the face shield (i.e., the portion above the user's eyes) such that the user may move the handle to reposition the glasses as desired.

Figure 4D:
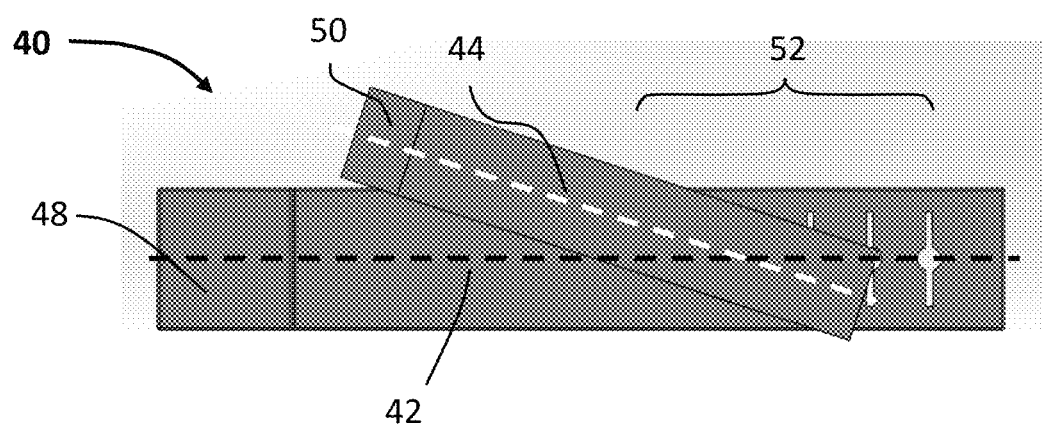
Figure 4E:
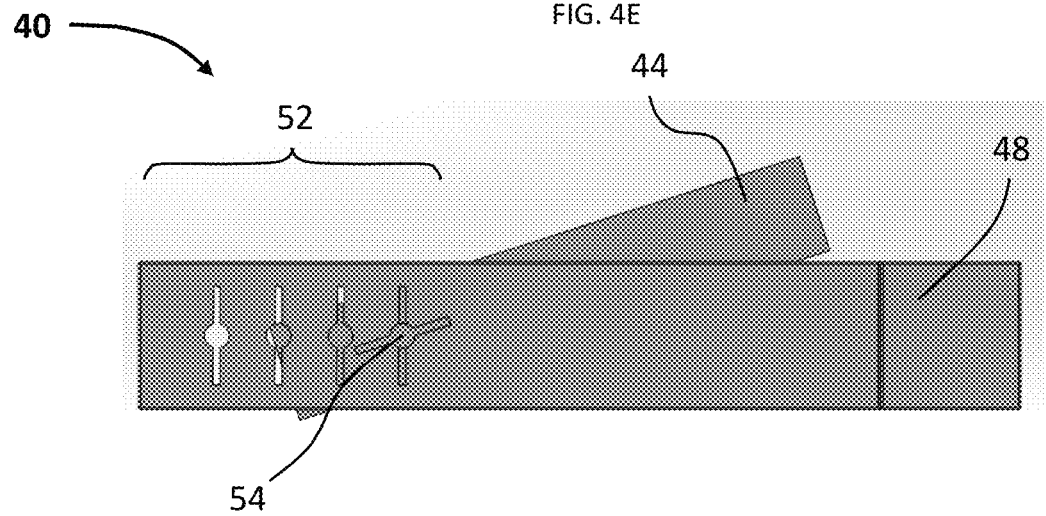

Referring now to FIGS. 4A-4F an apparatus is illustrated in perspective views (FIGS. 4A-4C) and side views illustrating the cross sectional shape of various portions of the apparatus (FIGS. 4D-4F). Apparatus 40 comprises a base portion 42 capable of being positioned on the solid barrier of a face shield with solid barrier attachment element 48. In the embodiment depicted, the solid barrier of a face shield may be inserted into attachment position 46, where frictional forces from the clip are exerted onto the face shield in order to support the apparatus and any eyewear attached thereto. Base portion 42 is attached to rotation portion 44 which comprises eyewear attachment element 50. Eyewear attachment element 50 is a port, dimensioned for a temple of eyewear to be inserted therethrough. Rotation element 44 is attached to base portion 42 through screw 52. Screw 52 in inserted through one hole in the plurality of holes 52 present on base portion 42 and connected into a matching hole (e.g., threaded hole) in rotation element 44. In some embodiments, the apparatus may adopt the opposite construction, where the rotation portion may comprise a hole for the screw to be inserted through and the base portion comprises one or a plurality of holes to match the screw or post (e.g., threaded holes). In FIG. 4D, the black dashed line shows the major longitudinal axis of the base portion and the white dashed line shows the major longitudinal axis of the rotation portion. Screw 54 can be hand tightened with the shown handle through any one of the plurality of holes 52 to allow a user to selectively position the apparatus for rotation where the temple tips of eyewear may sit on the ears of a user per typical wear. In some embodiments, the base portion may comprise a flexible portion (e.g., proximal to the solid barrier attachment element) in order to allow for the user to further set the plane of rotation with respect to the solid barrier. These apparatuses may attach to the side of the solid barrier. In some embodiments, two apparatuses may be attached on both sides of the solid barrier proximal to a user's ears. A user may attach the apparatus to a solid barrier and insert a temple of the eyewear through the port such that the base portion provides the requisite support, provided by the solid barrier, to afford rotation of the eyewear to an unobstructed position using the rotation portion.

A method is provided comprising:
a) attaching the apparatus according to claim 1 to the solid barrier with the solid barrier attachment element; and/or
b) attaching eyewear to the eyewear attachment element.
The method may comprise:
a) attaching a first apparatus having a first eyewear attachment element comprising a first port for a temple of eyewear;
b) attaching a second apparatus having a second eyewear attachment element comprising a second port for a temple of eyewear to a solid barrier of a face shield;
wherein said first apparatus and said second apparatus are those of the present disclosure (e.g., each are apparatus 40);
c) positioning a temple of eyewear through the first port; and
d) positioning a temple of eyewear through the second port;
wherein the first apparatus and second apparatus are attached to the solid barrier such that the temple tips of the eyewear in said first position are supported by a user's ears wearing said face shield. In various implementations, the first apparatus and second apparatus are attached to the solid barrier such that the temple tips of the eyewear in said second position are supported by a user's ears wearing said face shield.

In some embodiments, the method may comprise:
a) attaching eyewear to an apparatus;

b) inserting the apparatus between a head support and solid barrier of a face shield such that the eyewear may be positioned in front of the eyes on a user wearing the face shield and a portion of the apparatus will extend above the head support;

wherein the apparatus comprises:
  a) an eyewear attachment element to removably attach to eyewear;
  b) a solid barrier attachment element to be inserted between a head support of a face shield and the solid barrier of a face shield (e.g., a foam piece extending across the portion of the solid barrier and above the bridge of the nose of a user);
  c) a distal end opposite from the eyewear attachment element;

wherein the apparatus is dimensioned such that when inserted between the solid barrier and the head support, eyewear attached to the eyewear attachment element can be positioned in a first position where the lenses of eyewear are positioned between the solid barrier and the eyes of a user wearing the face shield and the distal end extends above the head support. In some embodiments, the method may comprise placing the face shield with apparatus inserted onto the head of a user such that the face shield is providing a protective barrier to the face of the user. In some embodiments, the method may comprise cutting the head support in order to accommodate the apparatus and decrease separation of the head support and face shield or decrease and minimize alteration of the solid barrier structure as compared to insertion into a head support that was not cut.

In some embodiments, the method may further comprise:
  c) pulling the portion of the apparatus to move the eyewear away from the eyes of a user when wearing the face shield and/or
  d) pushing the portion of the apparatus to move the eyewear towards the eyes of a user when wearing the face shield.

Kits are also provided which may comprise:
  a) a solid barrier that prevents the passage of solids and liquids therethrough; wherein said solid barrier comprises one or more eyewear attachment elements configured to allow for an eyewear element to be removably attached to said solid barrier; and
  b) an eyewear element capable of being removably attached to said solid barrier comprising lenses which refract light into the eyes of a user wearing the face shield when the eyewear element is attached to the solid barrier.

In some embodiments, the kit comprises:
an apparatus comprising:
  a) an eyewear attachment element to removably attach to eyewear;
  b) a solid barrier attachment element to be inserted between a head support of a face shield and the solid barrier of a face shield (e.g., a foam piece extending across the portion of the solid barrier and above the bridge of the nose of a user);
  c) a distal end opposite from the eyewear attachment element;

wherein the apparatus is dimensioned such that when inserted between the solid barrier and the head support, eyewear attached to the eyewear attachment element can be positioned in a first position where the lenses of eyewear are positioned between the solid barrier and the eyes of a user wearing the face shield and the distal end extends above the head support; and eyeglasses to attach to the apparatus. In some embodiments, the kit may comprise a cutting tool for cutting out a portion of the head support to match the shape of the apparatus and minimize or decrease alteration of the solid barrier surface during insertion.

Typically, the eyewear element comprises a frame portion attached (e.g., removably attached) to lenses which refract the light into the eyes of the user during the specific use of the face shield. In some embodiments, the eyewear element may comprise one or more pairs of interchangeable lenses, each pair of interchangeable lenses attachable to and removable from a lens receiving area of the frame portion, and wherein each interchangeable lens is configured to be inserted into one of the lens receiving areas; and a nose bridge portion removably attached to the frame portion. In some embodiments, the kit may comprise an eyewear element comprising a frame portion having one or more lens receiving areas. Eyewear elements include those described in U.S. Pat. No. 10,649,237, which is hereby incorporated by reference in its entirety.

Figure 5A:
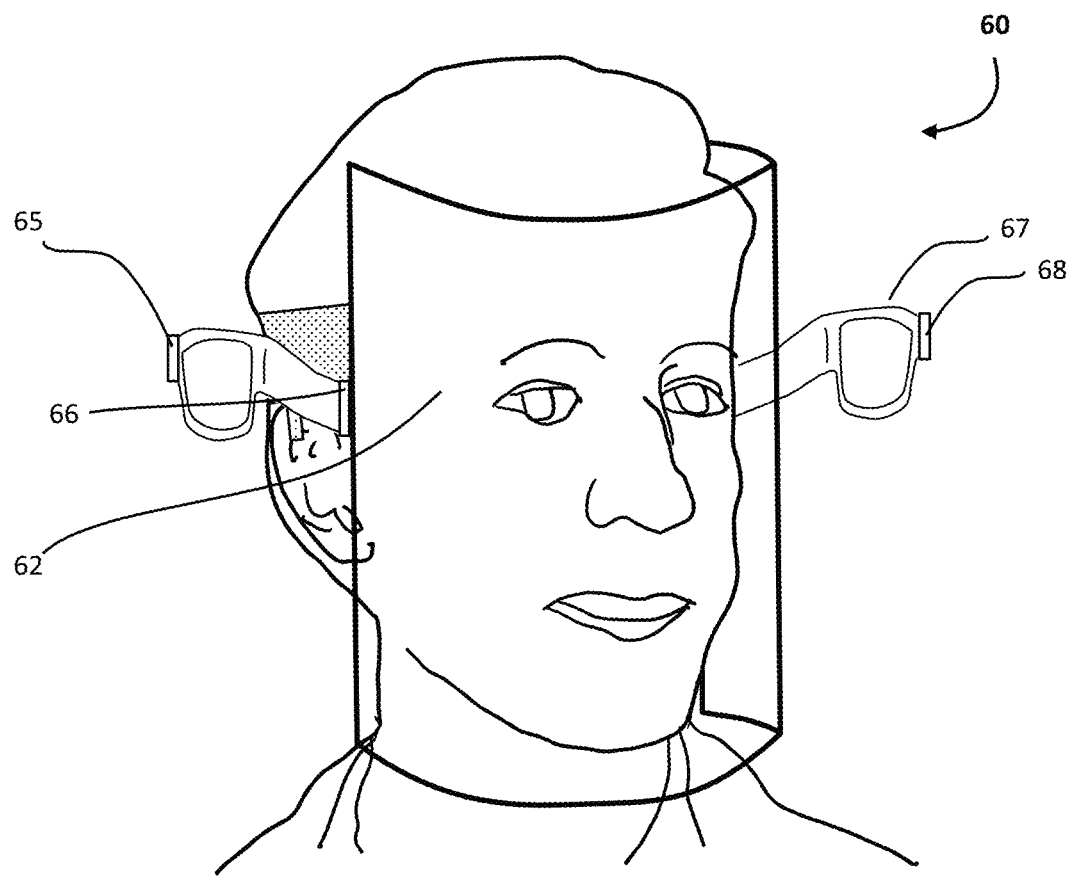
FIG. 5A is an illustration of a user wearing a have a face shield with eyewear configured for separation into two portions.
Figure 5B:
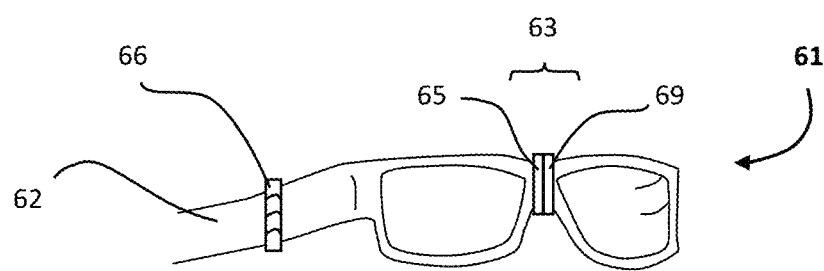
FIG. 5B is an illustration of the eyewear in FIG. 5A, with the two portions reattached at the bridge of the eyewear.

Referring now to FIGS. 5A and 5B, face shield 60 being worn by a user is illustrated. Eyewear 61 comprises bridge portion 63 which is separable. Eyewear 61 when separated at bridge portion 63 forms a first portion 65 and a second portion 67 each comprising a lens and a temple. The two portions are held together with magnets 65 and 68 which exert an attractive magnetic force between one another to keep the first and second eyewear portions together. In some embodiments, only one of these separable bridge portions comprises a magnet and the other is a metallic material such that a magnetic attraction between each portion is created. The portions may be separated and as shown in FIG. 5A, each portion may be moved to a position outside of the solid barrier via eyewear movement elements such as hinge 66. The present disclosure embraces face shields comprises eyewear having this configuration and the eyewear itself (particularly for use with a face shield). While wearing the face shield, a user may grip the temple of on portion (or a handle attached thereon) and rotate the portion via hinge 66 to a position unobstructed by the solid barrier in order to access the lens of the eyewear portion. This movement may be effected without removal of the solid barrier from the protective position in front of the user's face. Again, without movement of the face shield, the portion may then be rotated back into position, where the magnetic attraction between each portion of the bridge can orient the eyewear into a proper viewing position.

Figure 6A:
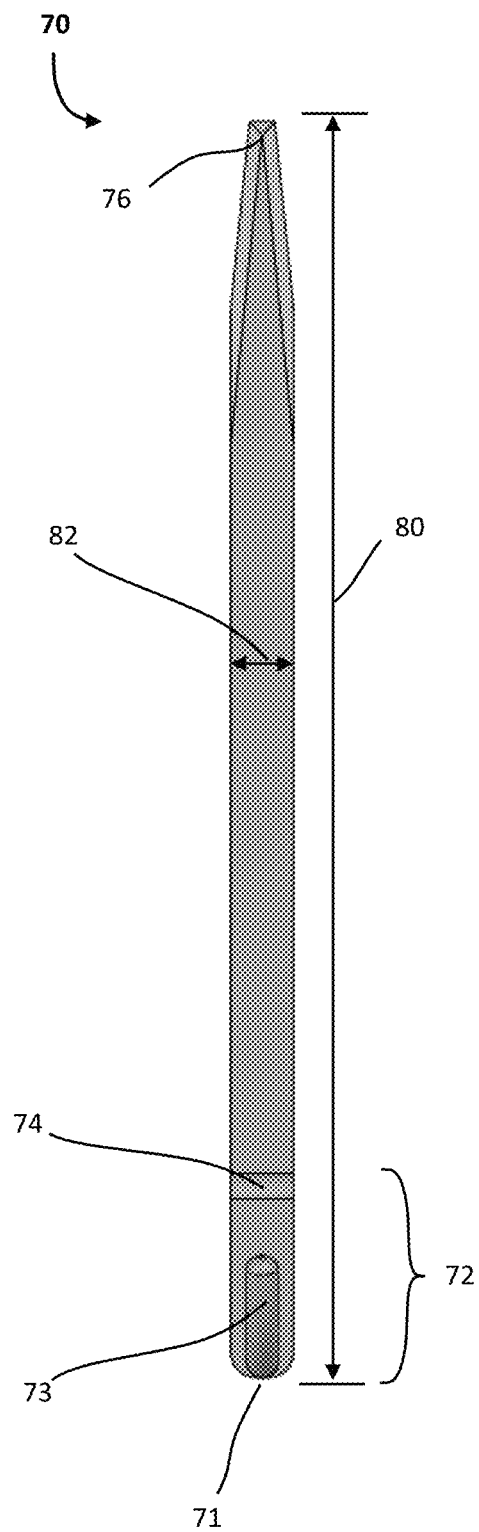
FIG. 6A is an illustration of a front view of an apparatus of the present disclosure.
Figure 6B:
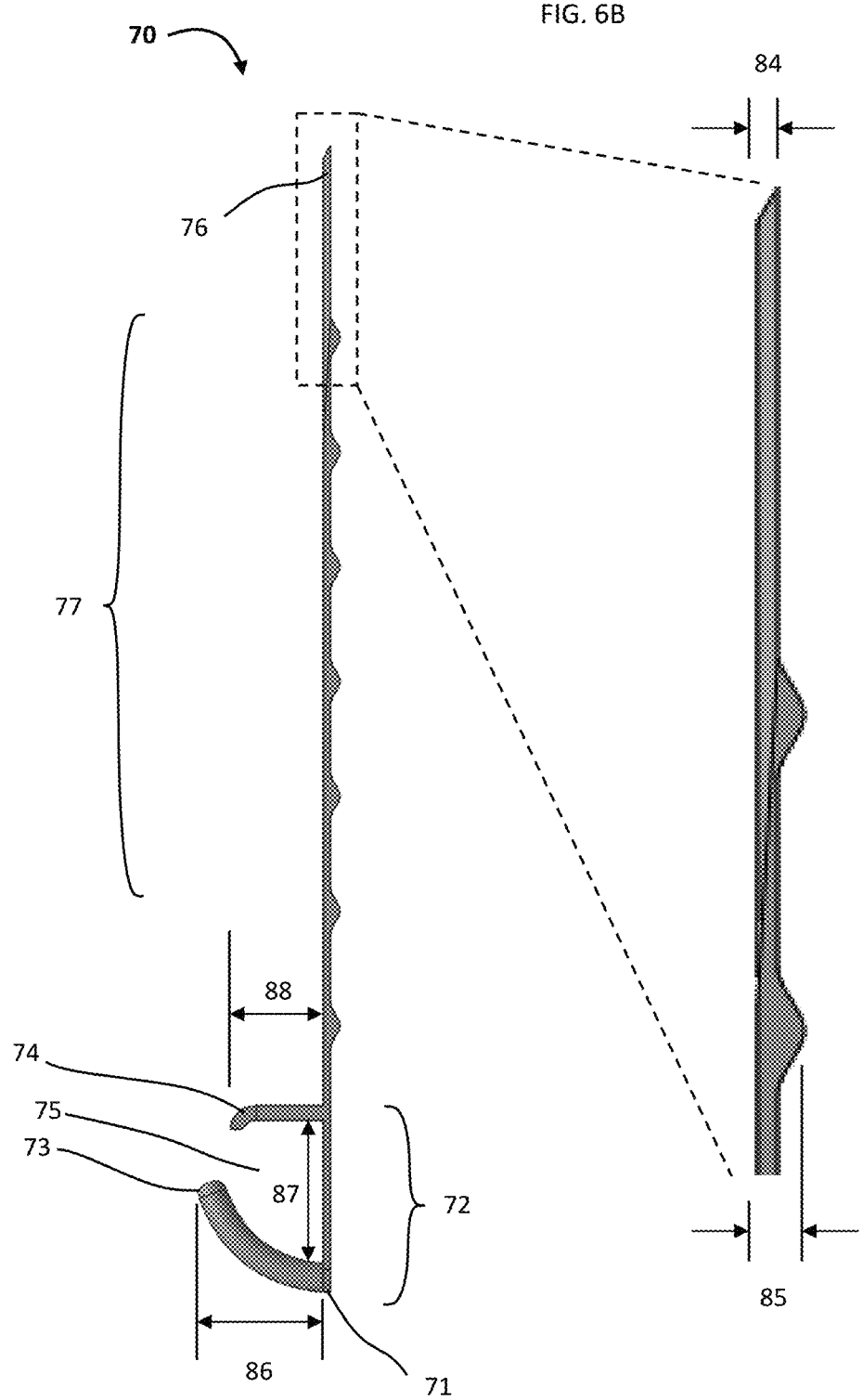
FIG. 6B is an illustration of the side view of the apparatus shown in FIG. 6A with an increased resolution of a distal end and notch in the solid barrier attachment element.

Referring now to FIGS. 6A-6B, an apparatus for attaching to a face shield is illustrated. Apparatus 70 has distal ends 71 and 76 separated a distance 80 along its major longitudinal axis (or length). This distance allows the eyewear to be attached to eyewear attachment 72 such that eyewear can be positioned in front of user's eyes when a face shield having a head support (e.g., foam) is positioned on a user's head such that solid barrier attachment element 77 may be inserted between the solid barrier and the head support whit distal end 76 protruding above the head support. Accordingly, a user may effectuate movement of the eyewear away from the eyes of the user by pulling distal end 76 away from the eyes (see, e.g., FIGS. 7A and 7B).

Eyewear attachment element 72 is positioned at distal end 71. Eyewear attachment element 72 comprises a hook 73 and wall 74 where hook 73 is at the distal end and curved inwardly along the major longitudinal axis. Wall 74 extends along the width (e.g., distance 82) of the apparatus. Wall 74 and hook 73 are positioned at distal end 71 to form a space 75 dimensioned for accommodating the bridge of eyewear.

For example, wall 74 is separated from the base of hook 73 a distance 87 to help form space 75. Hook 73 is also angled (e.g., has an angle of hook bending of from 10°-100° (e.g., from 20° to 70°) and extends a distance 86 from the surface of base portion of the apparatus 70. Additionally, wall 74 extends a distance 88 from the surface of the base portion of the apparatus 70. Wall 74 contains a generally flat surface to support the bridge of the eyewear. Wall 74 also has a curved lip oriented towards the hook to provide additional support to the eyewear. These dimensions operate to create a space where the bridge of the eyeglasses may be snapped into space 75 and supported by the eyewear attachment element.

The height of the base portion identified by dimension 84 (e.g., the height of the base portion) allows for insertion of apparatus 70 into the space between the head support of a face mask and the solid barrier thereof. The positioning between the head support and the solid barrier affords the force for attachment to the solid barrier using features commonly available on face masks (e.g., a foam head support piece adapted to conform to a user's head that also is attached to the solid barrier). The apparatus may be moved up and down through this space between the head support and solid barrier. Apparatus 70 comprises notches on the face opposite from eyewear attachment element 72. These notches may lock or hold the relative position of the apparatus with respect to the solid barrier until a user applies a force to distal end 76. The degree of locking force may be related to the number of notches (e.g., one, two, three, four, five, six, seven, eight, nine, ten), the shape of the notches (e.g., as determined by the chamfer of each notch), and the height of the notches from the surface. As can be seen, although apparatus 70 has a height 84 to afford insertion between the head rest and solid barrier, the notches, particularly which positioned on the indicated face, provide an increased separation 85 from the opposite face such that the normal force created by the head support and solid barrier is increased. Distance 85 may be the sum of width 84 and the height of the notches. In some embodiments, the length ratio of distance 85 to distance 84 is from 3:1 to 1:1 or from 2:1 to 1.1:1 or from 3:1 to 1.5:1 or from 3:1 to 1.1:1.

A similar apparatus 90 is shown in use in FIGS. 7A and 7B on a user wearing face mask 100 having a head support 101 and solid barrier 102 in its protective position in front of the face of the user. Apparatus 90 is attached to the bridge of eyeglasses 105 with eyewear attachment element 92 positioned at distal end 91. The apparatus is also attached to the solid barrier by insertion through the space 103 between head support 101 and solid barrier 102 above the nose of the user. In FIG. 7A, the eyewear is positioned in front of the eyes of the user. In FIG. 7B, by pulling on distal end 96 away from the eyes of the user, the eyewear can be moved above the user's eyes. When the user desires to reposition the eyewear (e.g., move from the position shown in FIG. 7B to the position shown in FIG. 7A), a user may supply a force to distal end 96 inducing movement of the eyewear to its typical position in front of the eyes.

The eyewear element may comprise lenses which correct a user's vision (i.e., prescriptive lenses). In some embodiments, the lenses may magnify an image such as those lenses typically used for reading. In some embodiments, the lenses may be are bifocal or trifocal lenses. The eyewear element (e.g., lenses), may comprises one or more coatings as well such as UV coating, anti-fog coating, scratch-resistance coating, and combinations thereof. For example, the lenses (e.g., polycarbonate lenses) comprise two or more of UV, anti-fog, and scratch-resistance coating. In certain embodiments, the lenses may comprise a hydrophilic coating to produce a long-lasting, durable anti-fog effect. The coating can include a molecular-level blend of at least two hydrophilic polymers. The coating can be made, for example, by a layer-by-layer assembly process, though other techniques can be used. The layer-by-layer assembly can be a water based process, thereby avoiding solvents and chemicals that can damage many plastic substrates (such as polycarbonate and poly(methyl methacrylate)) that are widely used in optical applications. The conformal coatings can be applied by, for example, a dip-, spin-, or spray-assembly process. The anti-fog coatings can be highly transparent and have highly effective antifogging performance under a variety of conditions. The durability of the coatings can be increased by a variety of common crosslinking and surface modification methods. In particular embodiments, the lenses are prescription lenses.

The devices described herein, such as the face shield, the apparatus, the base portion of the apparatus, the rotation portion of the apparatus, and the rotation elements (e.g., swivel, post, screw) the hook, the wall, may each be made of a unitary piece of suitable material (e.g., a material suitable for a production method), such as, by way of example, plastic. In some embodiments, the entire apparatus is made of a unitary piece of suitable material, such as, by way of example, plastic. Suitable plastics include polypropylene, polyethylene, thermoplastic polyurethane, thermoplastic rubber, thermoplastic elastomer, nylon (polyamide), acrylic, polycarbonate, polyoxymethylene, polystyrene, acrylonitrile butadiene styrene, or polyphenylsulfone, among others. Suitable production methods for these components include injection molding, compression molding, and/or 3-dimensional (3D) printing. The mold used in either production method features a single cavity per manufactured component.

As various changes can be made in the above-described subject matter without departing from the scope and spirit of the present disclosure, it is intended that all subject matter contained in the above description, or defined in the appended claims, be interpreted as descriptive and illustrative of the present disclosure. Many modifications and variations of the present disclosure are possible in light of the above teachings. Accordingly, the present description is intended to embrace all such alternatives, modifications and variances which fall within the scope of the appended claims.

All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the disclosure.

The invention claimed is:

1. An apparatus comprising:
 a) an eyewear attachment element to removably attach to eyewear;
 b) a solid barrier attachment element to be inserted between a head support of a face shield and the solid barrier of a face shield;
 c) a distal end opposite from the eyewear attachment element;
wherein the apparatus is dimensioned such that when inserted between the solid barrier and the head support, eyewear attached to the eyewear attachment element can be positioned in a first position where the lenses of eyewear are positioned between the solid barrier and the eyes of a user wearing the face shield and the distal end extends above the head support.

2. The apparatus according to claim 1, wherein the eyewear attachment element comprises a hook and a wall, and
  the space within the curvature of the hook and the wall is dimensioned to accommodate the bridge of the eyewear;
  the hook is curved towards the distal end and can provide support to the bottom of the bridge of the eyewear; and
  the wall extends along the width of the apparatus to provide support to the top of the bridge of the eyewear.

3. The apparatus according to claim 2, wherein the hook is a rounded hook having a circular cross section with a radius of from 1 mm to 2 cm.

4. The apparatus according to claim 2, wherein the wall extends across the width of the base portion and has a height of from 1 mm to 5 cm.

5. The apparatus according to claim 2, wherein the wall and the hook are separated by a distance of from 5 mm to 3 cm.

6. The apparatus according to claim 2, wherein the hook and/or wall are formed of a pliable material such that the hook and/or wall may be moved during insertion of the bridge of the eyewear to open a space for eyewear to be inserted into the space, however, once the eyewear is inserted, the wall and/or hook moves back to their typical position to support the eyewear.

7. The apparatus according to claim 1, wherein a side of the apparatus opposite from the eyewear attachment element comprises a flat surface having one or more notches.

8. The apparatus according to claim 1, wherein the apparatus comprises a base portion having a major longitudinal axis;
  wherein the eyewear attachment element comprises a hook and wall positioned to accommodate the bridge of the eyewear in the space therebetween; wherein the hook and wall are positioned at the distal end of the base portion on the surface of the base portion; and
  the opposite surface of the base portion comprises a flat surface having one or more notches.

9. The apparatus according to claim 8, wherein the height of the base portion is dimensioned to be inserted between the head support of a face shield and the solid barrier of a face shield and the one or more notches are dimensioned to inhibit movement of the apparatus when inserted therein.

10. The apparatus according to claim 9, wherein the height of the base portion is between 0.5 mm and 2 cm.

11. The apparatus according to claim 8, wherein the height of the one or more notches is independently from 0.5 mm to 2 cm.

12. The apparatus according to claim 8, wherein the length of the base portion is from 5 cm to 30 cm.

13. The apparatus according to claim 8, wherein the width is from 1 mm to 5 cm.

14. The apparatus according to claim 8, wherein the hook is a rounded hook having a circular cross section with a radius of from 1 mm to 2 cm.

15. The apparatus according to claim 8, wherein the wall extends across the width of the base portion and has a height of from 1 mm to 5 cm.

16. The apparatus according to claim 8, wherein the hook extends from the surface a distance of from 0.5 mm to 3 cm.

17. The apparatus according to claim 1, wherein said apparatus is made of a unitary piece of injection molded plastic.

18. The apparatus according to claim 8, wherein said apparatus is made of a unitary piece of injection molded plastic.

19. A method comprising:
  a) attaching eyewear to the apparatus of claim 1;
  b) inserting the apparatus between a head support and solid barrier of a face shield such that the eyewear may be positioned in front of the eyes on a user wearing the face shield and a portion of the apparatus will extend above the head support.

20. The method according to claim 19, further comprising:
  c) pulling the portion of the apparatus to move the eyewear away from the eyes of a user when wearing the face shield and/or
  d) pushing the portion of the apparatus to move the eyewear towards the eyes of a user when wearing the face shield.

* * * * *